United States Patent [19]
Sence et al.

[11] 3,837,627
[45] Sept. 24, 1974

[54] METHOD AND APPARATUS FOR GASIFYING A LIQUID

[75] Inventors: Leonard H. Sence, Milford; Thomas E. Sutton, Springdale, both of Ohio

[73] Assignee: Allis-Chalmers Corporation, Milwaukee, Wis.

[22] Filed: June 7, 1972

[21] Appl. No.: 260,633

[52] U.S. Cl.................. 261/29, 261/92, 261/120, 210/242
[51] Int. Cl.............................................. B01f 3/04
[58] Field of Search.......... 261/120, 92, DIG.15, 29; 210/242

[56] References Cited
UNITED STATES PATENTS

| | | | |
|---|---|---|---|
| 1,032,458 | 7/1972 | White | 210/242 |
| 1,740,441 | 12/1929 | Chogo | 261/DIG.75 |
| 1,824,416 | 9/1931 | Stover | 261/92 |
| 2,521,215 | 9/1950 | Haddeland et al. | 261/DIG.75 |
| 2,825,541 | 3/1958 | Moll et al. | 261/29 |
| 2,922,489 | 1/1960 | Hollingsworth | 261/92 |
| 3,130,679 | 4/1964 | Sence | 415/206 |
| 3,206,176 | 9/1965 | Peterson | 261/29 |
| 3,365,178 | 1/1968 | Bood | 261/120 |
| 3,738,620 | 6/1973 | Ennis | 261/DIG.75 |

*Primary Examiner*—Tim R. Miles
*Attorney, Agent, or Firm*—John P. Hines

[57] ABSTRACT

Floating apparatus for introducing gas into a liquid utilizing a centrifugal pump with its inlet only partially submerged below the liquid level so that both liquid and gas are drawn into the pumping chamber. The gas and liquid are agitated in the pumping chamber and discharged from the pump as a mixture of gas and liquid.

2 Claims, 1 Drawing Figure

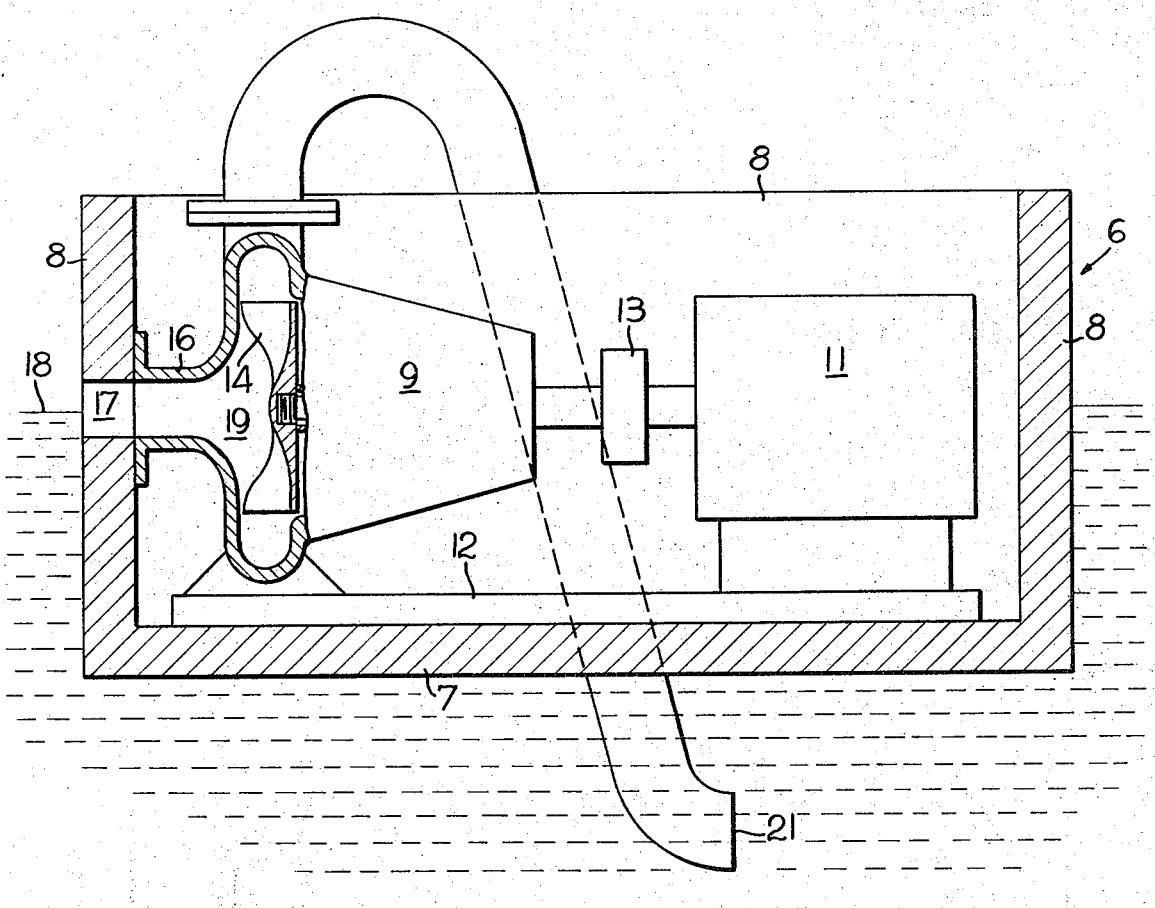

METHOD AND APPARATUS FOR GASIFYING A LIQUID

BACKGROUND OF THE INVENTION

This invention relates generally to the subject of introducing gases into liquids. Since in most cases the liquid involved is water and the gas involved is air, reference in this description will be to air and water. However, it should be understood that such reference is not intended to limit the invention and that any mixable gas and liquid could be utilized.

Prior methods and apparatus for aerating water can roughly be divided into three classes. The first class includes a device which delivers air to the bottom of the water to be aerated. Air is pumped through the tube which has a plurality of openings through which the air escapes into the water. The air and water become entrained as the bubbles perculate upwardly to the surface of the water. The second class includes paddle type devices which rotate partially in and partially out of the water beating the water and causing air to become entrained in the water. The third device includes a pump which takes water from the pond and propels it through spray heads in small droplets which are cooled and aerated as they fall back to the surface of the liquid.

SUMMARY OF THE INVENTION

The present invention contemplates aeration apparatus which does not clearly fit into any of the types above referred to. This invention utilizes a particular type of centrifugal pump. The pump involved utilizes a shear-lift force impeller of the type disclosed in U.S. Pat. No. 3,130,679 issued to L. H. Sence Apr. 28, 1964. It has been found that this particular type of pump is capable of pumping a liquid having a high percentage of air. The present apparatus utilizes such a pump by locating the pump inlet at the interface between the air and the water. The pump therefore draws in a mixture of air and water and thoroughly mixes it in the pumping chamber due to the agitation of the rotating impeller. The thoroughly mixed aerated water is then discharged either above, at, or below the surface of the liquid.

This apparatus has the advantage of utilizing structure which can be mounted on a float and supported on the water to be aerated. It is only necessary that the relative weight and flotation characteristic of the apparatus be such that the inlet to the pump be partially submerged below the surface of the water.

It is therefore the object of this invention to provide apparatus for gasifying a liquid which includes a centrifugal pump having the inlet only partially submerged in the liquid to be gasified.

A further object of this invention is to provide apparatus of the above described type wherein the pump utilized includes a shear-lift force impeller.

A more specific object of this invention is to provide apparatus of the hereinbefore described type wherein the gasified liquid is discharged from the pump in a thoroughly mixed state so that the discharge can be located beneath the liquid level.

Still an additional object of the subject invention is to provide a method for gasifying a liquid which includes the steps of drawing both gas and liquid into a pump and mixing the gas liquid within the pump so that it is discharged as gasified liquid.

These and other objects of the subject invention will become more fully apparent as the following description is read in light of the attached drawing which shows, partially in section, apparatus constructed in accordance with the invention.

DESCRIPTION OF THE DRAWINGS

Referring to the drawings, a floating platform generally designated 6 is comprised of a base 7 which may be constructed of any conventional boyant material. Four side walls 8 extend upward from the base 7 to provide a water tight interior.

A pump motor combination is supported within the interior of the floating platform. The pump 9 and motor 11 may both be supported on a base 12 and thereby be removable and insertable as a unit. A conventional shaft coupling 13 provides a connection between the motor and the pump. A shear-lift force impeller 14 is rotatably supported within the pump in well known manner. The pump inlet 16 is connected to an intake opening 17 which passes through the side wall 8 of the floating platform.

The boyant characteristic of the platform relative to the weight of the complete apparatus is such that the intake 17 to the pump 9 is always maintained at the interface 18 between the air and the liquid.

Since the liquid and air are thoroughly mixed and aerated within the pumping chamber 19 of the pump by the impeller 14, the outlet 21 from the pump may be placed either above or below the level of the liquid because the liquid discharging from the pump outlet is completely aerated. This permits utilization of this apparatus in an area where it is impossible to spray the water into the air to cause the aeration.

The embodiments of the invention in which an exclusive property or privilege is claimed are defined as follows:

1. Apparatus for mixing a gas and a liquid having an interface therebetween comprising: a platform floating on said liquid; a centrifugal pump having a pumping chamber with an inlet and a discharge supported on said platform, the inlet to said pumping chamber being located partially above and below the interface between said gas and said liquid so that both the gas and liquid are drawn into said pumping chamber where they are mixed and the mixture discharged through said pump discharge; and power means drivingly connected to said pump supported on said platform.

2. Apparatus for mixing a gas and a liquid having an interface therebetween comprising:
   a platform;
   a centrifugal pump having a pumping chamber with an inlet and a discharge supported on said platform, both the inlet to said pumping chamber and said pumping chamber being located partially above and below the interface between said gas and said liquid so that both said gas and liquid flow into said pumping chamber when said pump is not operating; and
   power means drivingly connected to said pump supported on said platform.

* * * * *